United States Patent Office 3,837,968
Patented Sept. 24, 1974

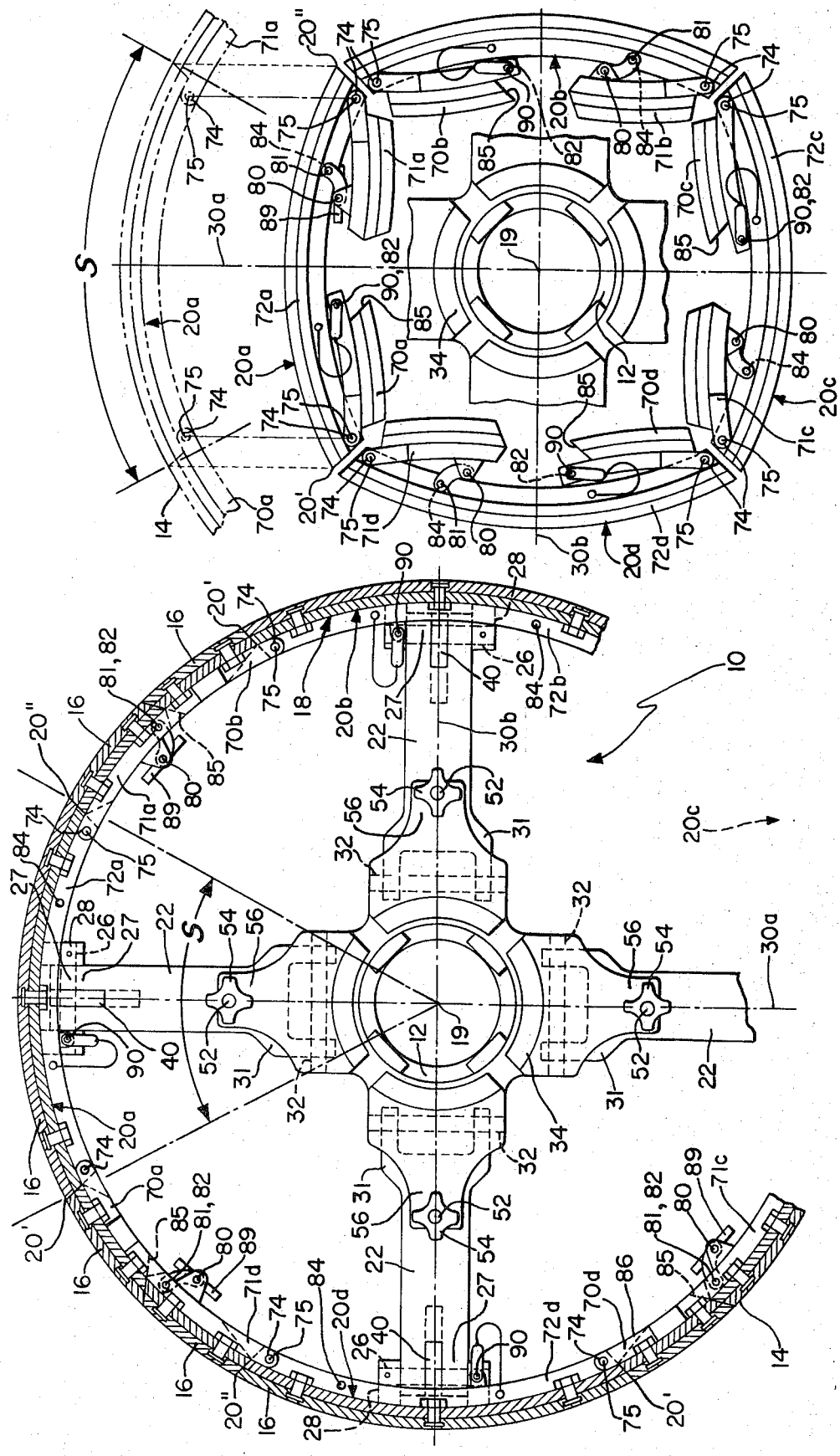

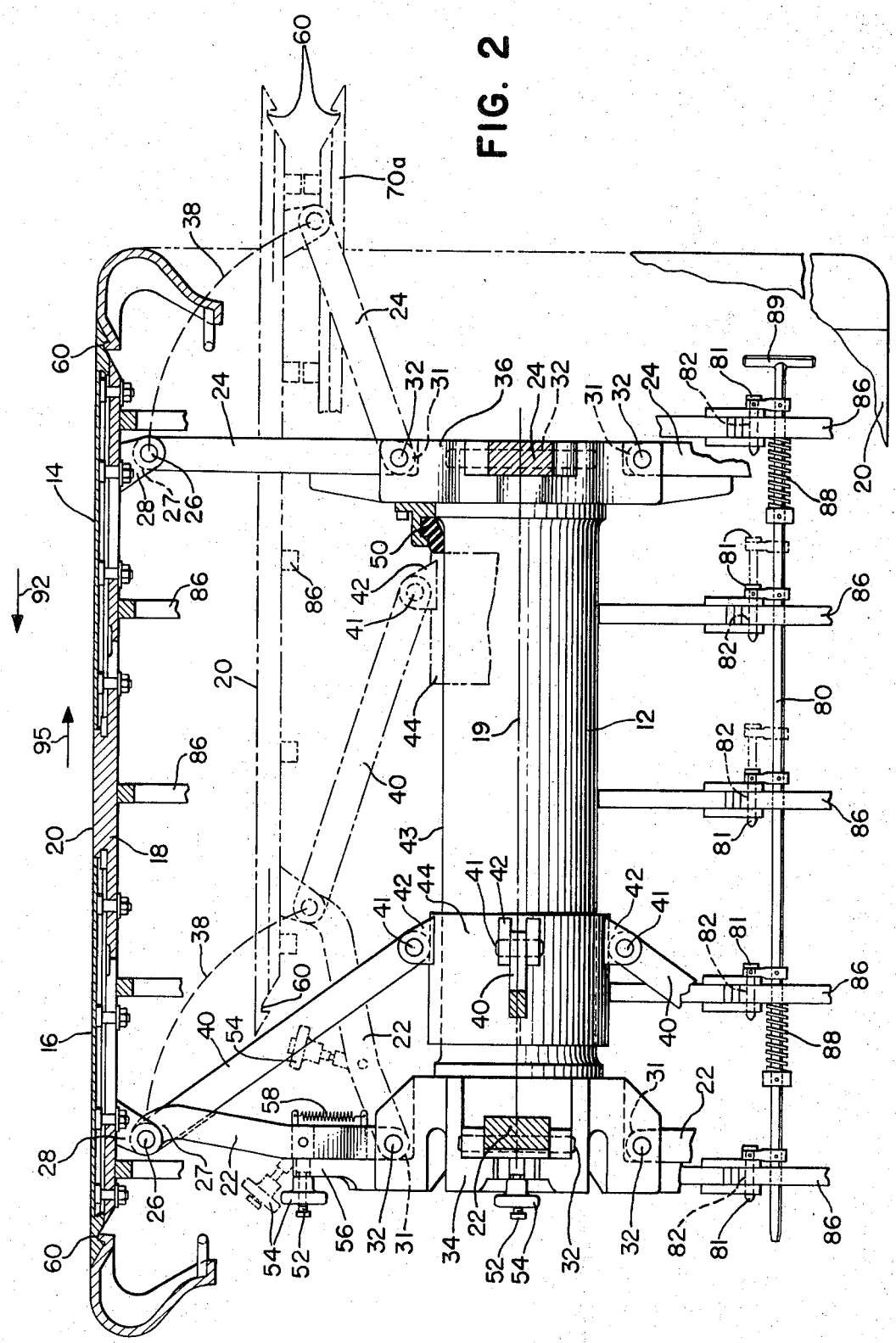

3,837,968
TIRE BUILDING DRUM
Theodore F. Marra, Barberton, Ohio, assignor to The Goodyear Tire & Rubber Company, Akron, Ohio
Filed Nov. 20, 1972, Ser. No. 308,063
Int. Cl. B29h 17/16
U.S. Cl. 156—415                    25 Claims

ABSTRACT OF THE DISCLOSURE

A tire building drum particularly adapted for massive tires such as those used in off-the-road construction equipment features four axially symmetrically collapsible segments each comprising a primary member and a pair of secondary members hinged about the longitudinal edges of the primary member to swing between positions cooperating to provide a continuous rigid cylindrical tire building surface and collapsed positions wherein the secondary members are swung beneath the respective primary members and wholly within the sector defined by the respective primary members.

The foregoing abstract is not to be taken as limiting the invention of this application, and in order to understand the full nature and extent of the technical disclosure of this application, reference must be made to the accompanying drawing and the following detailed description.

BACKGROUND OF THE INVENTION

A great number of tire building drums of the class known in the art as collapsing tire building drums have been proposed. Almost entirely such collapsing drums have been directed to the problem of construction of small tires. Mechanisms for the accomplishment of automatic and/or self-contained collapse of such drums can be classified as follows:

(A) Collapse mechanisms have linkages movable only in planes perpendicular to the axis.

(1) Collapse of the drum surfaces is in symmetry with the axis;
(2) Collapse is to a flat, or non-circular form.

(B) The collapsing mechanism linkage moves only in axial planes.

(1) Segments are divided into at least two groups of (minor and major) segments which move toward and away from the axis at differing rates and/or distances but without any relative axial displacement between the sets of segments;
(2) Arrangements wherein the different sets of segments are required to be displaced at differing rates or distances relatively along the axis.

(C) Collapsing mechanisms which require manual removal of one or more key segments of the cylindrical tire building surface.

(D) Collapse requires oblique movement of one or more of the segments forming the building surface.

In the prior art heretofore, the collapsing mechanisms of all of the above-enumerated categories were complex and difficult to maintain in adequate condition for the satisfactory construction of tires and have in no case been completely adequate for the construction of very heavy tires such as those used in off-the-road construction and civil engineering projects.

SUMMARY OF THE INVENTION

It is, therefore, an object of the present invention to provide a tire building drum which is simple, rugged, and effective for the construction of massive tires.

Other objects will become apparent in the detailed description which follows.

The objects and advantages of the invention claimed herein are accomplished by the provision of a tire building drum comprising a plurality of segments cooperable to provide a rigid continuous cylindrical tire building surface; center shaft means coaxial with said surface; collapsing means mounted on said center shaft means and operable to move said plurality of segments symmetrically toward and away from the axis of the drum; each segment of said plurality thereof comprising a primary member; hinge means fixed on the primary member and having a hinge axis extending longitudinally thereof parallel to the drum axis; and at least one secondary member mounted swingably about said hinge axis between a first position to provide a part of said cylindrical surface and a second position beneath said primary member.

In the drawings

FIG. 1 is a view in sectional elevation taken perpendicular to the drum axis of a tire building drum embodying the present invention;

FIG. 2 is a partial sectional elevation of the drum of FIG. 1 taken parallel to the axis thereof; and FIG. 3 is a sectional elevation oriented perpendicular to the axis showing the drum of FIG. 1 in its collapsed state.

DETAILED DESCRIPTION OF A PREFERRED EMBODIMENT

In the detailed description which follows, a tire building drum in accordance with the invention claimed herein is illustrative only and to acquaint persons skilled in the most closely related arts with the principles of the invention the scope of which is defined by the claims.

The tire building drum 10, referring to the drawings, provides an expanded, tire building, diameter of 54 inches and an overall width of 68 inches, which width may be adjusted in a conventional manner. The drum provides 16 inches of crown, weighs 5700 pounds, when made of steel, and can be collapsed to an overall diameter of 36¾ inches in order to pass through a tire bead diameter of 38 inches.

The tire building drum 10, according to the invention, may be considered as being most closely related to the class B-1, as categorized above.

The drum 10 is mounted on center shaft means here provided by the sleeve 12 adapted to fit on the spindle (not shown) of a tire building machine.

The cylindrical tire building surface 14 of the drum is provided by a plurality of shells 16 conventionally shaped and mounted on the body 18. The body is divided longitudinally, i.e., parallel to the axis 19 of the drum, to form a plurality of segments 20, four in the particular embodiment here described, and individually identified as 20a, 20b, 20c, and 20d.

To move the segments 20 symmetrically toward and away from the axis 19, collapsing means such as the two parallel operating links 22, 24 are pin-connected by link pivot pins 26 at their radially outer ends 27 to fixtures 28 mounted integrally with each respective segment along the axial planes 30a, 30b which bisect the segments. The radially inner ends 31 of the two parallel links 22, 24 are respectively pin connected by link pivot pins 32 to an inboard hub 34 fixed on or formed integrally with the center shaft sleeve 12 and to an outboard hub 36 affixed to the center shaft sleeve. The pivot axes of the several pivot pins are oriented perpendicularly with respect to the respective plane 30a, 30b so that the links are swingable in or parallel to the respective plane 30a, 30b and so that the segments 20 can be swung, each along an arcuate path 38 which is in its respective axial bisecting plane.

Collapsing movement of the segments 20 is made synchronous and coincident each with the others by the collapse control links 40 each of which is pin-connected by a pin 26 on the fixture 28 at its radially outer end to one of the segments 20 and the respectively associated parallel link 22. The radially inner end of each of the collapse control links 40 is pin-connected by a pin 41 to a fixture 42 made integral with a sliding collar 44 which is slidably movable along the outer surface 43 of the sleeve 12 between the hubs 34 and 36. Immediately inward of the hub 36 along the sleeve, a rubber cushion bumper 50 is provided to absorb impact of the collar 44 which is moved thereagainst when the drum 10 is collapsed. Each of the parallel links 22 is provided with a swing bolt 52 and hand knob or nut 54. In the expanded and working state of the drum, the swing bolts extend parallel to the drum axis 19 and are clamped against a bifurcated extension 56 of the hub 34 by manually tightening the threaded knob 54 against the extension 56. When the knob is loosed, the swing bolt is moved angularly about its pivot pin by the tension spring 58.

Each segment 20 is provided with a circumferentially extending groove 60 which can cooperate with an interfitting tongue to retain at the respective end of the drum a conventional shoulder flange of segmented construction in the usual manner.

The drum 10 thus far described will be recognized by persons skilled in the art as known construction.

According to the invention, each segment 20 comprises at least one, and preferably two, secondary members such as the secondary members 70a and 71a disposed one at each longitudinal edge 20' and 20" of the respectively associated primary member 72a of the segment 20a. Hinge means including the pivot pins 74 are fixed on the primary member 72a such that each hinge axis 75 extends longitudinally of the primary member and parallel to the drum axis. The hinge axes 75 are so located that the respective secondary members 70 and 71 can be swung inwardly from a first position (FIG. 1) whereat all the members cooperate to provide the cylindrical tire building surface 14, to a second position (FIG. 3) beneath the associated primary member 72. In the drum 10, each of the secondary members 70, 71 in the collapsed state of the drum is disposed wholly within the sector angle S defined by and between the axial planes containing the longitudinal edges 20' and 20" of the associated primary member 72 which angle, in this particular drum, is about 57 degrees of arc.

While the invention contemplates the use of a single secondary member in association with the primary member of each segment 20, the two secondary members 70 and 71, in combination with the parallel link pin-connections 26 disposed along the axial plane which bisects the primary member, are preferred.

In order to provide firm support for the cylindrical tire building surface in building a tire, lock means comprising a long rod 80 mounted rotatably, and slidably longitudinally, on each of the secondary members 71 of the respectively associated segment has fixed thereon a plurality of lock pins 81 which are selectively engageable in sockets 82, one set of which are emplaced in the respectively associated primary member 72, particularly in each of the circumferentially extending ribs 86 and in corresponding sockets 84 emplaced near the longitudinal free edge 85 of the secondary member, e.g., 70b, which is hingedly mounted on the circumferentially adjacent primary member 72b of the circumferentially adjacent segment 20b. A compression spring 88 mounted on the lock rod 80 operates to retain the lock pins 81 in their respective sockets. A T-handle 89 is provided at the outward end of the rod 80. The secondary member 70 is retained in its collapsed position beneath the respective primary member 72 by a captive keeper pin 90 one being provided conveniently adjacent each end of the drum 10.

OPERATION

The drum 10 is expanded into its operating state by urging one or more of the segments 20 in an axial direction as indicated by the arrow 92. Alternatively, the drum may be rotated slowly, making use of the mass of the individual segments and the resulting centrifugal force to expand the drum. With the links 22 disposed against the face of the extensions 56, one or more of the swing bolts 52 is or are moved into position parallel with the drum axis and the knob 54 tightened, preferably at each of the four links.

Beginning with the secondary member 70d now positioned in the lower lefthand quadrant, as seen in FIG. 3, the keeper pins 90 are removed and the member swung down into its expanded drum position, seen in FIG. 1. The drum is then rotated anti-clockwise some 45 degrees and the locking rod 80 of segment 20c manually pulled outwardly to release the lock pins 81 from their sockets 82 in the body ribs 86, permitting the secondary member 71c to swing anti-clockwise about its hinge pins and into abutting relation at its free edge with the free edge of the adjacent secondary member 70d just previously moved whereupon the locking rod 80 is rotated to align its locking pins 81 with the sockets 84 in the secondary member 70d which sockets are now in coaxial alignment with the pins 81. The drum is then rotated another one-eighth turn, approximately 45 degrees, to position the next secondary member 70a in the lower left quadrant as seen in FIG. 3, and the operational step described is repeated, and again repeated for the remaining secondary members. The flanges (not shown) are then assembled in known manner.

Persons skilled in the use of tire building drums of this class will rapidly discover modifications in procedure which seem to them advantageous. The foregoing is described in view of the fact that the secondary members in the drum are massive and weigh individually some 160 pounds. The procedure outlined here takes maximum advantage of gravity by positioning the drum so as to require a minimum of manual effort in the operation.

After a tire carcass has been assembled on and is to be removed from the drum 10, the end flanges are removed in the customary manner piece by piece. A selected lock rod 80, e.g., of segment 20a is then located at about the horizontal centerline of the drum as seen in FIG. 1 and pulled axially to release the lock pins 81 from their sockets 84 in the adjoining secondary member 70b. As the pins 81 are released, the secondary member 71a will swing inwardly sufficiently to release the segment 70b to swing anti-clockwise about its hinge pin to its collapsed position beneath its respective primary member 72b and the keeper pin 90 is then manually moved into the socket 82 which is now aligned with the keeper pin, storing the primary segment 70b in its collapsed position. The drum is then rotated about 90 degrees to position the next lock rod 80, e.g., of segment 20b, again at the horizontal centerline at the right side of the drum as seen in FIG. 1. The operational step is then repeated. After the drum is moved about 180 degrees, the first removed lock rod can be pulled and rotated to align the lock pins 81 with the sockets 84 in the body ribs and released to move inward, locking the secondary member 71a in its collapsed position. These operational steps are repeated for each of the four segments after which the swing bolt knobs 54 are loosened to release each of the respective links 22. Axial force is then applied to one or more of the segments in a direction, arrow 95, parallel to the axis 19 and the segments are collapsed following an arcuate path each in an axial plane as the tire is moved axially of the drum. Continued axial movement of the tire and of the segments locates the segments in the position seen in FIGS. 2 and 3 in which the maximum diameter of the collapsed drum is sufficiently less than the diameter of the tire at the bead so that the tire can be moved without interference off the drum. The tire being removed, the operation can be repeated for succeeding tires.

While certain representative embodiments and details have been shown for the purpose of illustrating the invention, it will be apparent to those skilled in the art that various changes and modifications may be made therein without departing from the spirit or scope of the invention.

What is claimed is:

1. A tire building drum comprising a plurality of segments cooperable to provide a rigid continuous cylindrical tire building surface; center shaft means coaxial with said surface; collapsing means mounted on said center shaft means and operable in directions parallel to the axis of the drum to move said plurality of segments radially equally toward and away from the axis of the drum; each segment of said plurality thereof comprising a primary member, hinge means independently and apart from said collapsing means fixed on the primary member and having a hinge axis extending longitudinally thereof parallel to the drum axis, and at least one secondary member free of direct connection with said collapsing means and mounted swingably about said hinge axis between a first position to provide a part of said cylindrical surface and a second position beneath said primary member.

2. A tire building drum as claimed in Claim 1, said collapsing means being operable to swing each of said segments along an arcuate path in the axial plane.

3. A tire building drum as claimed in Claim 2, each secondary member in the collapsed state of said drum being disposed wholly within the sector angle defined by the longitudinal edges of the associated primary member.

4. A tire building drum as claimed in Claim 1, said collapsing means being actuated in response to force externally of said drum applied on said segments in a direction parallel to the drum axis.

5. A tire building drum as claimed in Claim 4, each said primary member having a plurality of pin connections connecting said segments respectively to said collapsing means.

6. A tire building drum as claimed in Claim 5, each secondary member in the collapsed state of said drum is disposed wholly within the sector angle defined by the longitudinal edges of the associated primary member.

7. A tire building drum as claimed in claim 1, each said primary member having a plurality of pin connections connecting said segments respectively to said collapsing means.

8. A tire building drum as claimed in Claim 7, said pin connections on each segment being located along the axial midplane bisecting the arcuate length of the respective segment.

9. A tire building drum as claimed in Claim 8, said collapsing means being operable to swing each of said segments along an arcuate path in an axial plane.

10. A tire building drum as claimed in Claim 9, each secondary member in the collapsed state of said drum is disposed wholly within the sector angle defined by the longitudinal edges of the associated primary member.

11. A tire building drum as claimed in Claim 1, lock means carried by each of said segments and selectively enageable with its own said primary member and with a circumferentially adjacent segment to retain its own said secondary member respectively in said second and said first position.

12. A tire building drum as claimed in Claim 11, said lock means comprising an elongated rod mounted rotatably and slidably longitudinally on a secondary member of the respectively associated segment and a plurality of lock pins mounted on said rod for selective engagement in corresponding sockets placed in the respectively associated primary member and in a secondary member of an adjacent segment.

13. A tire building drum as claimed in Claim 12, each said segment comprising a pair of said hinge means, the respective hinge axes of which are disposed adjacent the respective longitudinal edges of the associated primary member and one said secondary member attached to each of said hinge means.

14. A tire building drum as claimed in Claim 13, each segment of said plurality thereof extending arcuately about one-fourth of the circumference of said cylindrical surface.

15. A tire building drum as claimed in Claim 14, each secondary member in the collapsed state of said drum is disposed wholly within the sector angle defined by the longitudinal edges of the associated primary member.

16. A tire building drum as claimed in Claim 1, each segment of said plurality thereof extending arcuately about one-fourth of the circumference of said cylindrical surface.

17. A tire building drum as claimed in Claim 16, each said primary member subtending an arc of about 57 degrees.

18. A tire building drum as claimed in Claim 17, each secondary member in the collapsed state of said drum is disposed wholly within the sector angle defined by the longitudinal edges of the associated primary member.

19. A tire building drum as claimed in Claim 16, each said segment comprising a pair of said hinge means, the respective hinge axes of which are disposed adjacent the respective longitudinal edges of the associated primary member and one said secondary member attached to each of said hinge means.

20. A tire building drum as claimed in Claim 1, each said segment comprising a pair of said hinge means, the respective hinge axes of which are disposed adjacent the respective longitudinal edges of the associated member and one said scondary member attached to each of said hinge means.

21. A tire building drum as claimed in Claim 20, each secondary member in the collapsed state of said drum is disposed wholly within the sector angle defined by the longitudinal edges of the associated primary member.

22. A tire building drum as claimed in Claim 20, said collapsing means being operable to swing each of said segments along an arcuate path in an axial plane.

23. A tire building drum as claimed in Claim 1, each secondary member in the collapsed state of said drum is disposed wholly within the sector angle defined by the longitudinal edges of the associated primary member.

24. A tire building drum as claimed in Claim 23, each said segment comprising a pair of said hinge means, the respective hinge axes of which are disposed adjacent the respective longitudinal edges of the associated primary member and one said secondary member attached to each of said hinge means.

25. A tire building drum as claimed in Claim 1, said collapsing means being operable to swing each of said segments along an arcuate path in an axial plane; said collapsing means being actuated in response to force applied on said segments in a direction parallel to the drum axis; each said segment having a plurality of pin connections connecting said segments respectively to said collapsing means; said pin connections on each segment being located along the axial midplane bisecting the arcuate length of the respective segment; lock means carried by each of said segments and selectively engageable with its own said primary member and with a circumferentially adjacent segment to retain its own said secondary member respectively in said second and said first position; said lock means comprising an elongated rod mounted rotatably and slidably longitudinally on a secondary member of the respectively associated segment and a plurality of lock pins mounted on said rod for selective engagement in corresponding sockets placed in the respectively associated primary member and in a secondary member of an adjacent segment; each segment of said plurality thereof extending arcuately about one-fourth of the circumference of said cylindrical surface; each said primary member subtending an arc of about 57 degrees; each said segment comprising a pair of said hinge means, the respective hinge axes of which are disposed adjacent the respective longitudinal edges of the associated primary member and one said secondary member attached to each of said hinge means; and each secondary member in the collapsed state of said drum is disposed wholly within the sector angle defined by the longitudinal edges of the associated primary member.

References Cited

UNITED STATES PATENTS

| | | | |
|---|---|---|---|
| 2,339,543 | 1/1944 | Bishop | 156—415 |
| 3,038,526 | 6/1962 | Breg | 156—420 |
| 2,603,581 | 7/1952 | Ericson et al. | 156—415 |
| 3,547,733 | 12/1970 | Leblond | 156—415 |
| 2,016,884 | 10/1935 | Bostwick | 156—420 |
| 1,946,449 | 2/1934 | Williams | 156—420 X |
| 2,073,291 | 3/1937 | Templeton | 156—420 |

CLIFTON B. COSBY, Primary Examiner

U.S. Cl. X.R.

156—420